(No Model.) 2 Sheets—Sheet 1.
H. B. BEAIRSTO.
WAGON BRAKE.
No. 419,626. Patented Jan. 21, 1890.
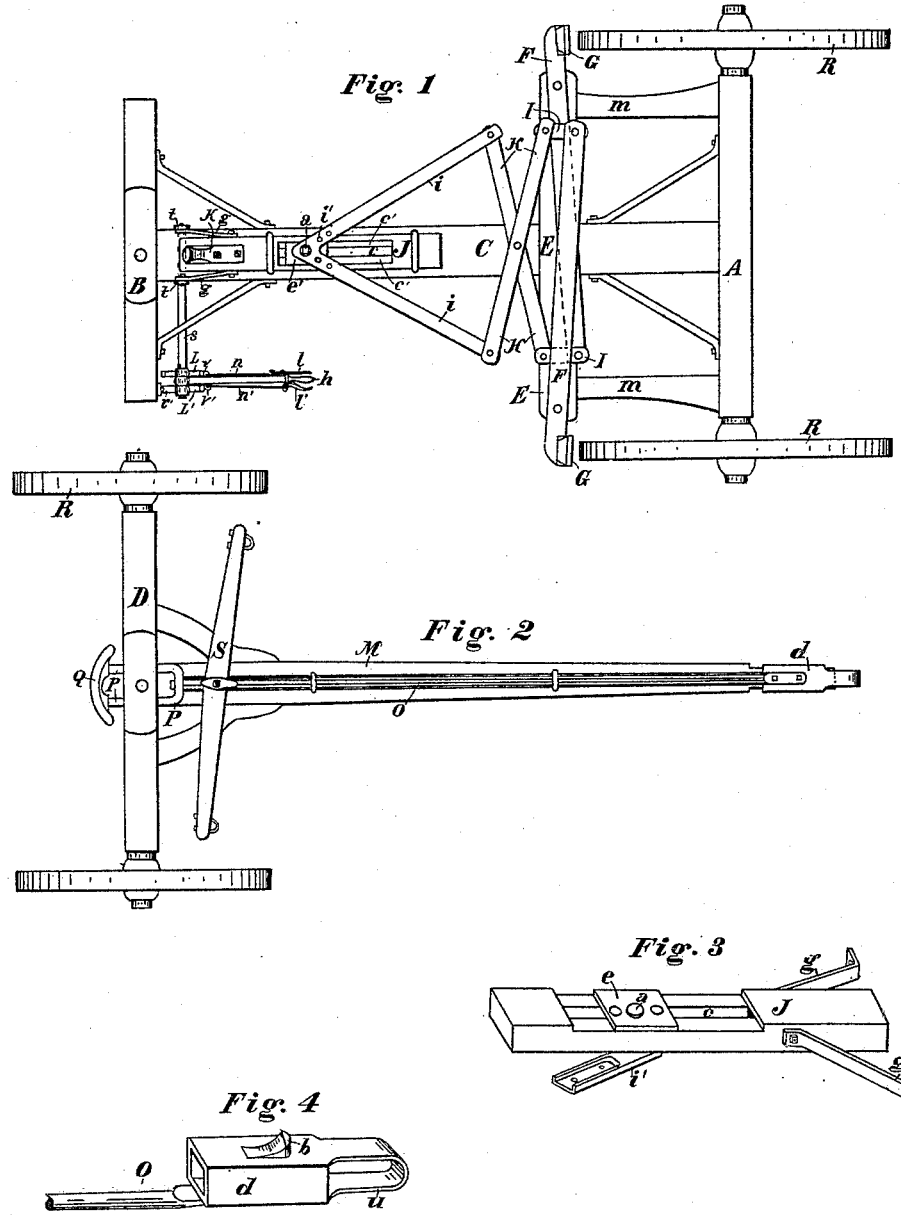
WITNESSES:
A. J. Chapman
W. E. Mancur
INVENTOR
Henry B. Beairsto,
BY
P. H. J. Lander,
ATTORNEY (No Model.) 2 Sheets—Sheet 2.

H. B. BEAIRSTO.
WAGON BRAKE.

No. 419,626. Patented Jan. 21, 1890.

WITNESSES: INVENTOR
Henry B. Beairsto,
BY
Attorney

UNITED STATES PATENT OFFICE.

HENRY B. BEAIRSTO, OF FORT FAIRFIELD, MAINE, ASSIGNOR OF TWO-THIRDS TO EDWARD L. HOUGHTON AND GEORGE C. CARY, BOTH OF SAME PLACE.

WAGON-BRAKE.

SPECIFICATION forming part of Letters Patent No. 419,626, dated January 21, 1890.

Application filed June 3, 1889. Serial No. 312,988. (No model.)

*To all whom it may concern:*

Be it known that I, HENRY B. BEAIRSTO, a citizen of the United States, residing at Fort Fairfield, in the county of Aroostook and State of Maine, have invented a new and useful Wagon-Brake; and I do hereby declare that the following is a full, clear, and exact description of the invention, which will enable others skilled in the art to which it appertains to make and use the same.

This invention relates to that class of wagon-brakes wherein the weight of the wagon-load, in conjunction with the back-pressure of the horses attached thereto, tends to automatically work the brake-levers and trig the rear wheels of the vehicle in proportion to the weight of the load and the angle of descending incline.

The object of my invention is to furnish an improved wagon-brake acting against the rear wheels of the vehicle, operated either by the horses or by hand and entirely controlled by the driver, as will hereinafter be fully explained.

Throughout the description reference is made to the accompanying drawings, in two sheets, in which—

Figure 5:
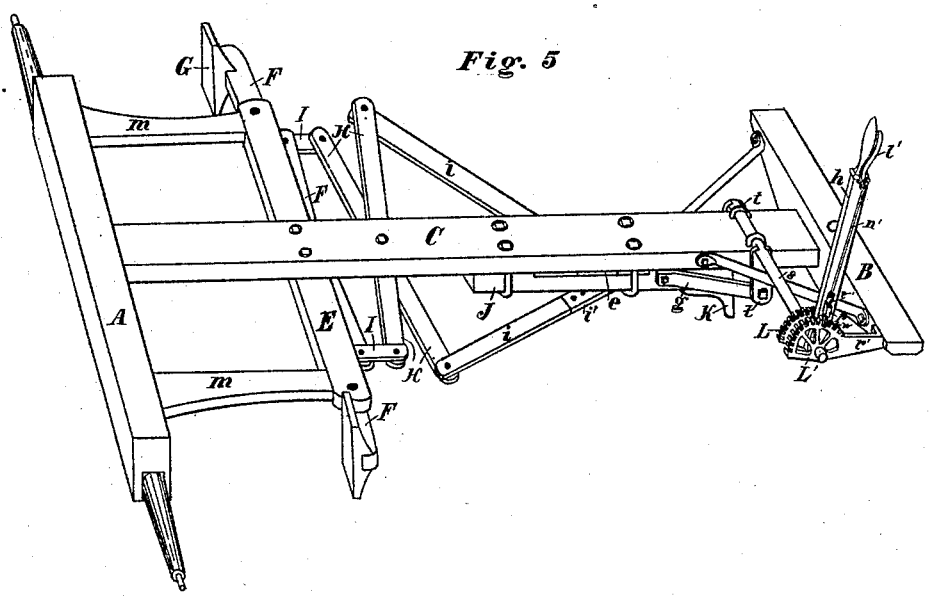
Figures 6, 7, 8:
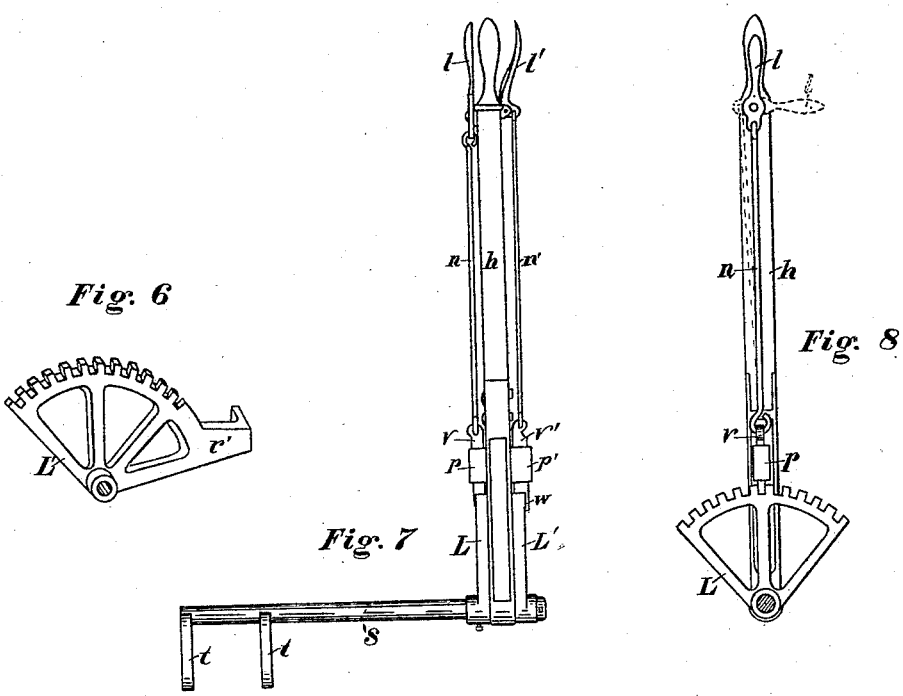

Figure 1 is a plan view of the under gear of a wagon having the forward wheels removed and showing my improved brake attached. Fig. 2 is a plan of the forward axle and pole of a wagon, showing the construction and attachments necessary to operate my improved brake by the horses. Fig. 3 is an isometric view of the sliding bar used in operating the levers of my improved brake. Fig. 4 is an isometric view of the sliding pole-cap, showing a portion of the pole-rod attached. Fig. 5 is a perspective view of the wagon under-gear, showing my improved brake and its operating mechanism. Fig. 6 is a perspective view of the outer notched quadrant used in my device. Fig. 7 is a rear elevation of the hand brake-lever with its catches and attachments, quadrants, and hand lever-shaft. Fig. 8 is a side elevation of the hand brake-lever and inner quadrant.

Similar letters of reference refer to corresponding like parts throughout the several figures.

In the drawings, C represents the connecting-bar, which connects the rocker B and rear axle A of a wagon under-gear. To this connecting-bar C, I attach a cross-piece E, parallel to the rear axle A, and strengthened and connected thereto by braces $m\ m$. Pivoted to the cross-piece E, near its extremities, are the transverse brake-levers F F, projecting outward as far as the periphery of the rear wheels R R and provided with brake-shoes G G at their outer ends. The opposite ends of the brake-levers F F extend by each other at the center, and are connected by short bars I I to the ends of toggle-levers H H, which are in turn pivoted at their centers, where they cross, to the connecting-bar C of the wagon. The remaining ends of the toggle-levers H H are pivoted to and connected, by the connecting-rods $i\ i$, to a sliding piece J, adapted to slide longitudinally on the wagon connecting-bar C, just behind the rocker B, as shown in Figs. 1 and 5.

The forward end of the sliding bar J is provided with an L-shaped iron K, bolted thereto in such position that its right-angular projection extends downward therefrom. It can now be understood that when the sliding bar J slides rearward it draws, by means of the attached connecting-rods $i\ i$, the toggle-levers H H, and their connections I I, the inner ends of the brake-levers F F forward. Consequently the opposite ends of the said brake-levers pass rearward, by which action the brake-shoes G G are pressed against the periphery of the rear wheels R R. The force applied to the sliding bar J is multiplied through the lever-connections, and, owing to the long purchase obtained by the brake-levers F F, great power is applied to the wheels. To operate this mechanism automatically, or, rather, by the back-pressure of the horses, I attach a long pole-rod $o$ to the pole M (shown in Fig. 2) in such manner that it can slide longitudinally. I also provide a cap $d$, to slide upon the free end of the pole M, and confine one end of the pole-rod $o$ to this cap. The cap $d$ is constructed with a projecting stud $b$ upon its under side, which forms a stop for the pole-ring of a neck-yoke, which is confined to the harnesses of the attached horses. The outer end of the pole-cap $d$, I preferably construct with a loop $u$, which will prevent it from sliding rearward too far upon the end of the pole. The rear end of the pole-rod $o$ branches just before it reaches the axle D, and the two branches P P extend through holes bored through this axle each side of the draft-bolt hole. Their projecting ends are firmly fastened to the cross-piece Q, which is constructed from metal and preferably crowning, attached with its convex surface rearward.

The equalizer S, instead of fastening to the pole M, I pivot to the pole-rod $o$ at the usual place and position.

Now it can readily be seen that when the forward axle D is pivoted to the rocker B in the usual manner any rearward movement of the sliding cap $d$ will be transmitted along the pole-rod $o$, force the cross-piece Q, connected thereto, against the angle-iron K, attached to the forward end of the sliding bar J, and if much back-pressure is applied (the same as would occur by means of the horses holding back going down a hill) the cross-piece Q will force back the sliding bar J, and thus operate the brake-levers and press the brake-shoes G against the rear wheels. As soon as the bottom of the hill is reached and the horses are obliged to pull, the draft being attached to the pole-rod $o$ will pull the latter and its connections forward and release the pressure of the brakes.

A spring may be attached in any convenient location to the sliding bar J, to press the latter forward and keep the brake-shoes from interfering with the wheels when the brakes are not in action.

In order to have my brake attachments adjustable for wagons of various lengths, I cut a slot $c$ through the center of the sliding bar J, place a plate of iron $e\ e'$ each side of the bar, and connect them by the bolt $a$, passing through each the slot $c$ and the ends of the connecting-rods $i\ i$. The bolt $a$, when tightened, serves to hold the two plates $e$ and $e'$ in position, and by first loosening the nut upon this bolt the sliding bar J can be adjusted either forward or backward. Then by tightening the said nut the plates $e$ and $e'$, together with the connecting-rods $i$, will be firmly fastened thereto.

As the connecting-rods $i\ i$ in practice have no perceptible movement upon the bolt $a$, I find it better to rigidly fasten these ends of the said rods (when constructed from wood) to the arms of a V-shaped iron, which latter is provided with a hole to receive the bolt $a$.

Now in order to operate my brake herein described by hand and have it at all times under the control of the driver, I fasten to the top of the connecting-bar C, just behind the rocker B, a brake-shaft $s$, having two downward projections $t\ t$, which extend downward each side of the said connecting-bar, and are pivoted at their lower ends to short connecting-rods $g\ g$, which are in turn pivoted at their opposite ends to the sliding bar J. This brake-shaft $s$ extends transversely across the connecting-bar C, and projects horizontally therefrom about as far as the extension of the rocker B on that side. Its outer end is held and supported in the hub of a quadrant L', (shown in Figs. 5 and 6,) having its periphery notched and an arm $r'$ extending therefrom, the end of which is provided with means for being rigidly fastened to the rocker B. There is also located upon the brake-shaft $s$ a second notched quadrant L, whose hub is rigidly fastened to the shaft, and a hand-lever $h$ projects upward between these two quadrants.

The hand-lever $h$ is at liberty to turn upon the shaft $s$, and it is provided upon each side with guides $p\ p'$, through which catches $v\ v'$ slide and engage the notches in the periphery of the quadrants L and L'. These catches $v$ and $v'$ are connected by connecting-rods $n$ and $n'$ to their respective operating-handles $l$ and $l'$, attached to the upper part of the hand brake-lever $h$. The inner handle $l$ works on a pivot and is drawn downward to disengage the catch $v$ from the notches in the inner quadrant L, as shown by the dotted lines in Fig. 8 of the drawings. The outer handle $l'$ on the opposite side of the hand brake-lever $h$ is hinged to the latter and operated by compression toward the hand brake-lever to withdraw the outer catch $v'$ from the notches in the outer quadrant L'. A spring at the back of this outer handle $l'$ restores the latter to its former position when the grasp of the hand is released. I provide the outer catch $v'$ with a short lip $w$ at its lower ends, which projects over the outside of the outer quadrant and serves to steady the hand brake-lever $h$ when the inner catch $v$ is disengaged.

To operate my improved brake by hand, the driver places the inner handle $l$ in a vertical position, grasps the upper end of the hand-brake lever $h$, and compresses the outer handle $l'$, which latter movement withdraws the outer catch $v'$ from the notched outer quadrant L'. As the inner quadrant L is rigidly confined to the brake-shaft $s$, by pushing the hand brake-lever forward it partially rotates the shaft $s$ and by means of the arms $t\ t$ and attached connecting-rods $g\ g$ transmits a rearward movement to the sliding bar J, and thus operates the connecting mechanism and presses the brake-shoes G G against the wheels. The minute the driver releases the pressure upon the outer handle $l'$ the latter springs outward and forces the outer catch into a notch in the outer quadrant L'. Thus the brakes are held against the wheels as long as desired.

When the inner handle $l$ is pulled down at right angles with the hand brake-lever $h$, the inner catch $v$ is withdrawn from the inner quadrant L, and the mechanism is then free to be operated by the horses. This brake can thus be changed in an instant from horse to hand power or held in any position by simply operating the hand brake-lever $h$ and the two handles $l$ and $l'$ attached thereto.

Having thus described my invention, what I claim, and desire to secure by Letters Patent of the United States, is—

1. An improved wagon-brake, consisting of the combination of the brake-levers F with brake-shoes G, connections I, toggle-levers H, connecting-rods $i$, and sliding bar J with the pole-rod $o$, having branches P and connecting-piece Q at one end, and pole-cap $d$, having projecting stud $b$ attached to its opposite end and adapted to slide, as set forth, and press against the end of the sliding bar J to operate the brakes, all substantially as shown, and for the purpose set forth and described.

2. The combination, with the under-gear of a vehicle, of the brake for the same, consisting of the combination of the brake-levers F, having brake-shoes G, the connections I, toggle-levers H, connecting-rods $i$, and sliding bar J, having angle-iron K, all attached, as set forth, with the hand-lever attachment consisting of the brake-shaft $s$ with its depending arms $t$ and connecting-rods $g$, the notched quadrants L L', one of which has an extension $r'$ with means for attachment to the rocker B, and the hand brake-lever $h$, provided with sliding catches $v\ v'$, adapted to engage the notches in the quadrants and connected by connecting-rods $n\ n'$ to operating-handles $l$ and $l'$, all constructed substantially as shown, and for the purpose described.

3. With a wagon under-gear having a cross-piece E attached to its connecting-bar C, the wagon-brake attachment consisting of the combination, with the brake-levers F, with brake-shoes G, the connecting-bars I, toggle-levers H, and connecting-rods $i$, confined to the sliding bar J, the sliding bar having slot $c$, provided with plates $e$ and $e'$ each side thereof, confined with the connecting-rods $i$ by the adjusting-bolt $a$, the angle-iron K, pole-rod $o$, with sliding cap $d$, attached to one end, and branches P, with cross-piece Q, at opposite end, adapted to press against the angle-iron K on the sliding bar to operate the brake-levers with the hand-operating attachment consisting of the combination of the brake-shaft $s$ with depending arms $t$ and connecting-rods $g$, the notched quadrants L and L' on the outer end of the brake-shaft $s$, and the hand brake-lever $h$, having the guides $p\ p'$, sliding catches $v\ v'$, connecting-rods $n\ n'$, and operating-handles $l\ l'$, all constructed substantially as shown, and for the purpose set forth and described.

HENRY B. BEAIRSTO.

Witnesses:
H. L. BECKWITH,
CHAS. S. SMITH.